United States Patent
Terashima

(10) Patent No.: US 12,141,067 B2
(45) Date of Patent: Nov. 12, 2024

(54) SEMICONDUCTOR DEVICE

(71) Applicant: RENESAS ELECTRONICS CORPORATION, Tokyo (JP)

(72) Inventor: Kazuaki Terashima, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 18/347,148

(22) Filed: Jul. 5, 2023

(65) Prior Publication Data

US 2024/0104018 A1    Mar. 28, 2024

(30) Foreign Application Priority Data

Sep. 28, 2022 (JP) ................................. 2022-155106

(51) Int. Cl.
*G06F 12/0831* (2016.01)
*G06F 13/28* (2006.01)

(52) U.S. Cl.
CPC .......... *G06F 12/0835* (2013.01); *G06F 13/28* (2013.01)

(58) Field of Classification Search
None
See application file for complete search history.

(56) References Cited

U.S. PATENT DOCUMENTS

| 7,222,244 B2 | 5/2007 | Kawahara et al. |
| 9,152,382 B2* | 10/2015 | Hickmann ................ G06F 7/60 |
| 11,709,783 B1* | 7/2023 | Chen ................... G06F 12/0238 |
| | | 710/26 |
| 2022/0092408 A1* | 3/2022 | Khaitan ................. G06F 13/28 |

FOREIGN PATENT DOCUMENTS

JP     2002-229690 A     8/2002

* cited by examiner

*Primary Examiner* — Khoa D Doan
*Assistant Examiner* — Edmund H Kwong
(74) *Attorney, Agent, or Firm* — Rimon P.C.

(57) ABSTRACT

A second memory stores a plurality of input data sets DSi composed of a plurality of pieces of input data. N multiply-accumulate units are capable of performing parallel processings, and each performs a multiply-accumulate operation on any one of the plurality of weight parameter sets and any one of the plurality of input data sets. A second DMA controller transfers the input data set from the second memory to the n multiply-accumulate units. A measurement circuit measures a degree of matching/mismatching of logic levels among the plurality of pieces of input data contained in the input data set within the memory MEM2, the sequence controller controls the number of parallel processings by the n multiply-accumulate units based on a measurement result by the measurement circuit.

15 Claims, 12 Drawing Sheets

26:MEASUREMENT RESULT TABLE

| INPUT DATA SET | TOGGLE NUMBER |
|---|---|
| DSi[1] | CNs[1] |
| DSi[2] | CNs[2] |
| ... | |
| DSi[j] | CNs[j] |

SEMICONDUCTOR DEVICE

CROSS-REFERENCE TO RELATED APPLICATIONS

The present application claims priority from Japanese Patent Application No. 2022-155106 filed on Sep. 28, 2022, the content of which is hereby incorporated by reference to this application.

BACKGROUND

The present invention relates to a semiconductor device, for example, a semiconductor device performing a neural network processing.

Patent Document 1 (Japanese Patent Application Laid-open No. 2002-229690) shows a configuration in which a power state control circuit for controlling a power state of a logic circuit block and a prediction circuit for controlling the power state control circuit according to presence or absence of an input to the logic circuit block are added in each of logic circuit blocks configuring a semiconductor device. This makes it possible to achieve power reduction in an independent distributed manner when a wide variety of IPs are on-chip.

SUMMARY

For example, in a processing of a neural network such as a CNN (Convolutional Neural Network), a large amount of arithmetic processings is performed by using a plurality of DMA (Direct Memory Access) controllers and a plurality of multiply-accumulate units that are mounted on a semiconductor device. Specifically, the DMA controller transfers input data of a certain convolutional layer, which is stored in, for example, a memory, that is, pixel data and the weight parameters to the multiply-accumulate unit, thereby causing the multiply-accumulate unit to perform a multiply-accumulate operation. Also, the DMA controller transfers, as input data for the next convolutional layer, an operation result by the multiply-accumulate unit to the memory. The semiconductor device repeatedly performs such processings.

In such a semiconductor device, the number of mounted multiply-accumulate units increases as miniaturization of manufacturing processes and maturation of circuits advance. Furthermore, as processing efficiency of the neural network increases, the number of operations capable of being performed within a unit time, that is, the number of parallel processings of the multiply-accumulate unit also increases. However, power consumption also increases as the number of parallel processings of the multiply-accumulate units increases. For example, in a semiconductor device for a vehicle system or the like, an upper limit value may be provided for allowable power consumption of the semiconductor device according to power supply specification, temperature specification, and the like of the system. When the number of parallel processings of the multiply-accumulate unit increases, the power consumption may exceed the upper limit value.

Meanwhile, the power consumption can change depending on not only presence or absence of input data to the multiply-accumulate unit as shown in Patent Document 1 but also patterns of the input data. For example, if the input data is each pixel value of a camera image, the power consumption may change depending on density changes. A camera with a wider dynamic range tends to have a greater density change, so that the power consumption may become greater insomuch as the camera image has the greater density change.

Therefore, assuming the camera image with the large density change, it is conceivable to determine the number of parallel processings of the multiply-accumulate unit in a fixed manner so that the power consumption does not exceed the upper limit value. However, in this case, in processing a camera image with a small density change, processing capacity is excessively lowered and the processing time of the neural network may increase.

An embodiment described below has been made from this viewpoint, and other problems and novel features will be apparent from the description of the present specification and the accompanying drawings.

A semiconductor device according to one embodiment performs a processing of a neural network, and includes first and second memories, n multiply-accumulate units, first and second DMA controllers, a sequence controller, and a measurement circuit. The first memory stores a plurality of weight parameter sets composed of a plurality of weight parameters. The second memory stores a plurality of input data sets composed of a plurality of pieces of input data. The n multiply-accumulate units are capable of performing parallel processings, and each performs a multiply-accumulate operation on any one of the plurality of weight parameter sets and any one of the plurality of input data sets. The first DMA controller transfers the one or more weight parameter sets from the first memory to the n multiply-accumulate units. The second DMA controller transfers the one or more input data sets from the second memory to the n multiply-accumulate units. The sequence controller controls the second DMA controller and the n multiply-accumulate units based on an input command. Here, the measurement circuit measures a degree of matching/mismatching of logic levels among the plurality of pieces of input data contained in the input data set in the second memory, and the sequence controller controls the number of parallel processings performed by the n multiply-accumulate units based on a measurement result of the measurement circuit.

Using the semiconductor device according to one embodiment makes it possible to enhance the processing efficiency of the neural network within a range of the allowable power consumption.

DETAILED DESCRIPTION

Figure 1:
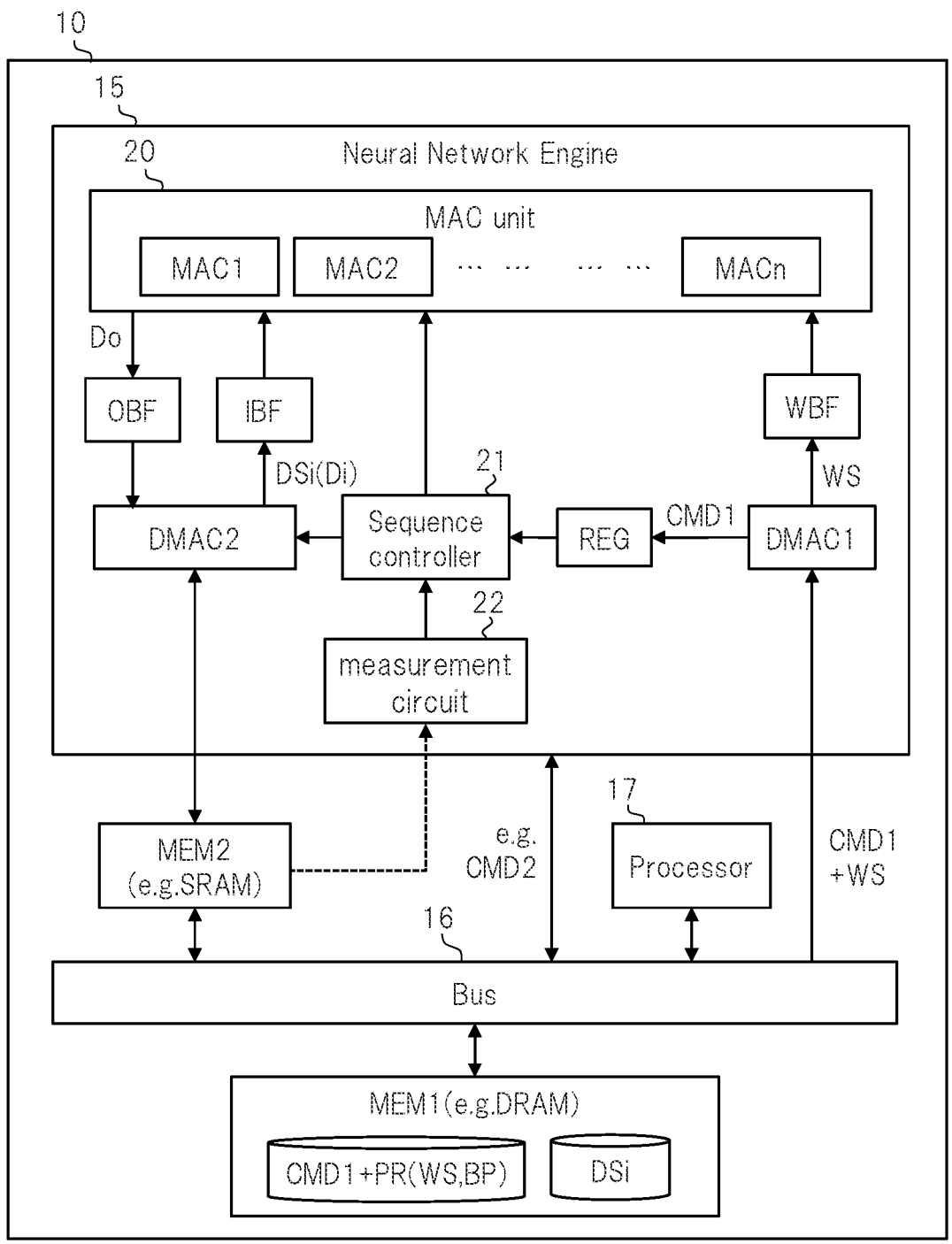
FIG. 1 is an outline diagram showing a configuration example of a main part in a semiconductor device according to a first embodiment.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted. In addition, the description of the same or similar portions is not repeated in principle unless particularly required in the following embodiments.

First Embodiment

<Outline of Semiconductor Device>

FIG. 1 is an outline diagram showing a configuration example of a main part in a semiconductor device according to a first embodiment. A semiconductor device 10 shown in FIG. 1 is, for example, a Soc (System on Chip) or the like configured by one semiconductor chip. The semiconductor device 10 is typically mounted in a vehicle ECU (Electronic Control Unit) or the like, and provides ADAS (Advanced Driver Assistance System) functions.

The semiconductor device 10 shown in FIG. 1 has a neural network engine 15, a processor 17 such as a CPU (Central Processing Unit) or a DSP (Advance Driver Assistance System), memories MEM1, MEM2, and a system bus 16. The system bus 16 interconnects the neural network engine 15, the memories MEM1, MEM2, and the processor 17. The neural network engine 15 performs a neural network processing represented by a CNN. The processor 17 causes the semiconductor device 10 to perform predetermined functions including control of the neural network engine 15 by executing a predetermined program stored in the memory MEM1.

The memory (first memory) MEM1 is, for example, a DRAM (Dynamic Random Access Memory). The memory MEM1 stores a plurality of input data sets DSi forming camera images and the like, an input command CMD1, and parameters PR. One input data set DSi is, for example, data in a pixel space that is a unit of convolution processing, and is composed of a plurality of pieces of input data Di, in other words, a plurality of pieces of pixel data. The input command CMD1 includes various information for controlling a sequence operation of the neural network engine 15. The parameters PR include a bias parameter BP and a plurality of weight parameter sets WS. Each of the plurality of weight parameter sets WS is composed of a plurality of weight parameters.

The neural network engine 15 includes a plurality of DMA controllers DMAC1, DMAC2, a MAC unit 20, a sequence controller 21, a measurement circuit 22, a register REG, and various buffers. The various buffers include weight parameter buffers WBF, data input buffers IBF, and data output buffers OBF. The various buffers may be, particularly, registers composed of latch circuits such as flip-flops.

The MAC unit 20 includes n multiply-accumulate units MAC1 to MACn, where n is an integer of 2 or more. The n multiply-accumulate units MAC1 to MACn are capable of performing parallel processings. Each of the n multiply-accumulate units MAC1 to MACn includes, for example, a plurality of multipliers and one adder that adds multiplication results from the plurality of multipliers, thereby performing multiply-accumulate operations. In the specification, the n multiply-accumulate units MAC1 to MACn are collectively referred to as multiply-accumulate units MAC.

The weight parameter buffer WBF stores one or more weight parameter sets WS, and outputs the weight parameter sets WS to the multiply-accumulate units MAC in the MAC unit 20. The data input buffer IBF stores one or more input data sets DSi, and outputs the input data sets DSi to the multiply-accumulate units MAC in the MAC unit 20. The data output buffer OBF stores output data Do from the multiply-accumulate units MAC in the MAC unit 20.

A DMA controller (first DMA controller) DMAC1 transfers the one or more weight parameter sets WS from the memory MEM1 to the weight parameter buffer WBF and thus to the multiply-accumulate units MAC via the system bus 16. The DMA controller DMAC1 also reads the input command CMD1 from the memory MEM1, and writes the input command CMD1 to the register REG. For example, the weight parameter set WS and the input command CMD1 are allocated in a data width direction, and are read out in parallel from the memory MEM1.

The memory (second memory) MEM2 is, for example, a memory that is faster than the memory MEM1, specifically, an SRAM or the like, and is used as a high-speed cache memory for the neural network engine 15, particularly, the MAC unit 20. The memory MEM2 stores the plurality of input data sets DSi and the output data Do. For example, the plurality of input data sets DSi constituting camera images and the like are used in the neural network engine 15 after being copied from the memory MEM1 to the memory MEM2 in advance.

The DMA controller (second DMA controller) DMAC2 transfers the one or more input data sets DSi from the memory MEM2 to the data input buffer IBF and thus to the multiply-accumulate units MAC. Further, the DMA controller DMAC2 transfers the output data Do from the data output buffer OBF and thus from the multiply-accumulate units MAC to the memory MEM2.

Each multiply-accumulate unit MAC in the MAC unit 20 performs a multiply-accumulate operation on any of the plurality of weight parameter sets WS from the weight parameter buffer WBF and any of the plurality of input data sets DSi from the data input buffer IBF. That is, each multiply-accumulate unit MAC performs a multiply-accumulate operation on the plurality of weight parameters contained in one weight parameter set WS and the plurality of pieces of input data Di contained in one input data set DSi, thereby, for example, performing a processing in the convolutional layer.

Further, each multiply-accumulate unit MAC writes, as output data Do, a result of the multiply-accumulate operation to the data output buffer OBF. The output data Do written in the data output buffer OBF is transferred to the memory MEM2 by the DMA controller DMAC2. The output data Do transferred to the memory MEM2 becomes, for example, the input data Di in the next convolutional layer. Incidentally, although details are omitted, each multiply-accumulate unit MAC may perform various processings required in the CNN for adding a value of the bias parameter BP to the result of the multiply-accumulate operation, calculating an activation function, processing a pooling layer, and the like.

The measurement circuit 22 measures a degree of matching/mismatching of logic levels among the plurality of pieces of input data Di contained in the input data set DSi of the memory MEM2. The sequence controller 21 controls an operation sequence of the neural network engine 15 as a whole. As one of them, the sequence controller 21 controls the DMA controller DMAC2 and the MAC unit 20 based on input commands and measurement results by the measurement circuit 22. The input command is the input command CMD1 stored in the register REG or the input command CMD2 outputted by the processor 17 via the system bus 16.

As the control of the DMA controller DMAC2, the sequence controller 21 controls ON/OFF of the DMA controller DMAC2, more specifically, ON/OFF of each transfer channel in the DMA controller DMAC2, in other words, activation/deactivation. Then, for the transfer channel of the DMA controller DMAC2 controlled to be ON, the sequence controller 21 sets a transfer source address in transferring the input data set DSi from the memory MEM2, a transfer destination address in transferring the output data Do to the memory MEM2, and the like.

Also, the sequence controller 21 controls, as the control of the MAC unit 20, the number of parallel processings by the n multiply-accumulate units MAC1 to MACn. That is, the sequence controller 21 controls ON/OFF, in other words, activation/deactivation of each multiply-accumulate unit MAC. Although details thereof will be described later, the sequence controller 21 performs such control of the number of parallel processings based on a measurement result by the measurement circuit 22.

Figure 2A:
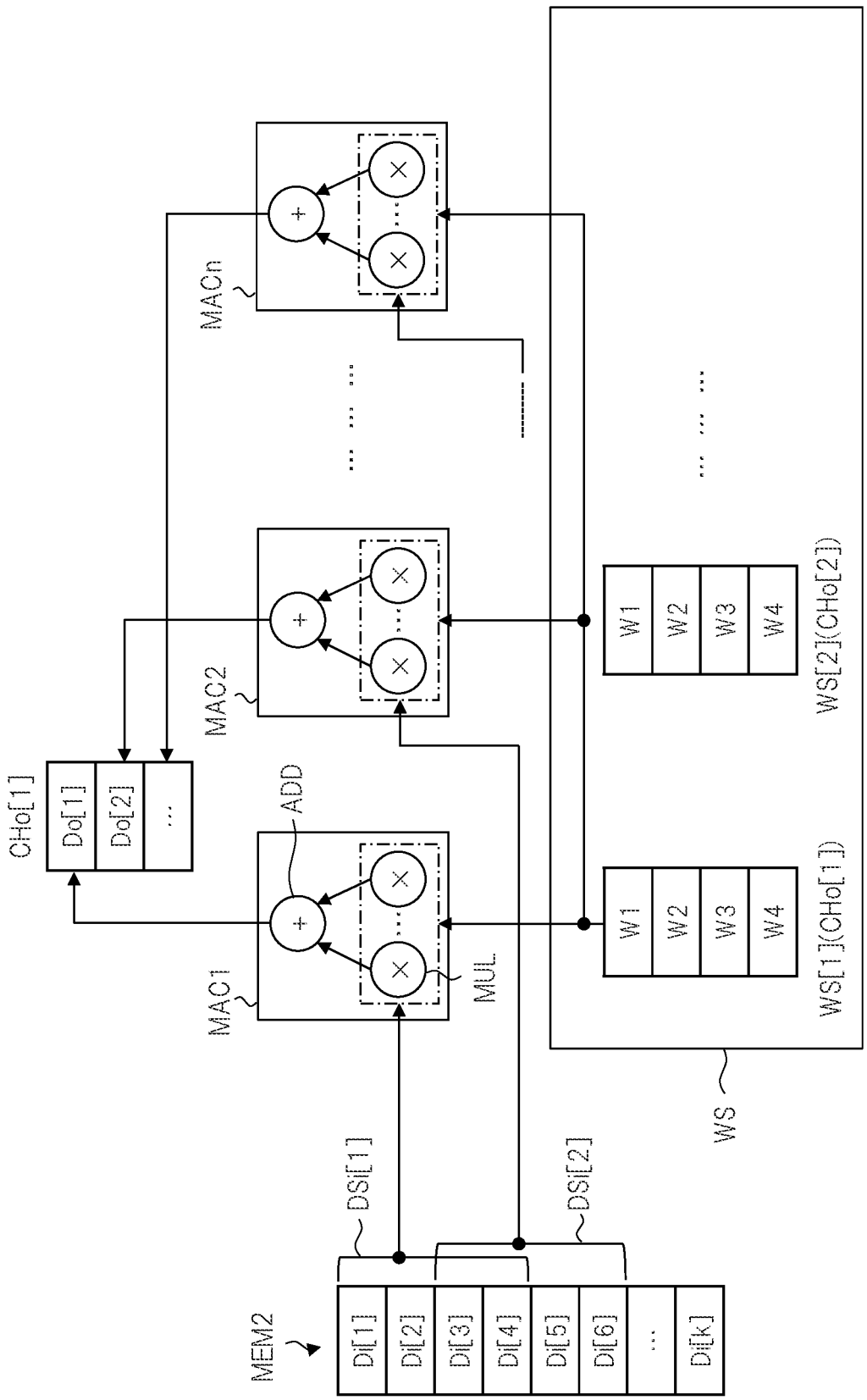
FIG. 2A is a schematic diagram showing a more detailed configuration example and operation example of a MAC unit in FIG. 1.

FIG. 2A is a schematic diagram showing a more detailed configuration example and operation example of the MAC unit in FIG. 1. In FIG. 2A, in a certain control cycle, shown is a case in which the n multiply-accumulate units MAC1 to MACn perform the multiply-accumulate operations on the same weight parameter set WS and data in a different pixel space associated with the convolution processing, that is, the mutually different input data sets DSi.

In this example, shown as the weight parameter set WS are the plurality of weight parameter sets WS[1], WS[2], respectively corresponding to the plurality of output channels CHo[1], CHo[2], . . . . Each of the plurality of weight parameter sets WS[1], WS[2], . . . , for example, are composed of four (=2×2) weigh parameters W1 to W4. Incidentally, each value of the weight parameters W1 to W4 in the weight parameter set WS[1] and each value of the weight parameters W1 to W4 in the weight parameter set WS[2] can differ appropriately.

The memory MEM2 also stores a plurality of input data sets DSi[1], DSi[2], . . . . The input data set DSi[1] is composed of the same four (=2×2) pieces of input data Di[1] to Di[4] as the weight parameter set WS, in other words, pixel data. Similarly, the input data set DSi[2] is also composed of four pieces of input data Di[3] to Di[6]. For example, the input data set DSi[1] is data in a first pixel space involved in the convolution processing, here, in a 2×2 pixel space, and the input data set DSi[2] is data in a second pixel space involved in the convolution processing.

As shown in FIG. 2A, in a certain control cycle, the same weight parameter set WS[1] is inputted to the n multiply-accumulate units MAC1 to MACn. Also, the respective different input data sets DSi[1], DSi[2], . . . , are inputted to the n multiply-accumulate units MAC. Each multiply-accumulate unit MAC includes a plurality of, in this example, four multipliers MUL, and one adder ADD for adding multiplication results from the plurality of multipliers MUL.

The multiply-accumulate units MAC1 perform multiply-accumulate operations on four weight parameters W1 to W4 contained in the weight parameter set WS[1] and four pieces of input data Di[1] to Di[4] contained in the input data set DSi[1]. Consequently, the multiply-accumulate unit MAC1 generates output data Do[1] of a first coordinate in a feature map of the output channel CHo[1]. In parallel with this, the multiply-accumulate unit MAC2 performs multiply-accumulate operations on the four weight parameters W1 to W4 contained in the weight parameter set WS[1] and the four pieces of input data Di[3] to Di[6] contained in the input data set DSi[2]. Consequently, the multiply-accumulate unit MAC2 generates output data Do[2] of a second coordinate in a feature map of the output channel CHo[1].

In this way, when the convolution processings for all the pixel spaces are completed, the feature map of the output channel CHo[1] is completed. Thereafter, a similar convolution processing is performed by using the weight parameter set WS[2] of the output channel CHo[2] instead of the weight parameter set WS[1] of the output channel CHo[1]. As a result, the feature map of the output channel CHo[2] is completed.

Incidentally, here, each weighting parameter set WS is composed of four (=2×2) weight parameters W1 to W4 in order to simplify the explanation. However, the number of weight parameters appropriately varies depending on the configuration of the CNN or the like, and can be, for example, "3×3×the number of input channels" and the like. In response, the number of multipliers MUL required for each multiply-accumulate unit MAC can be also changed appropriately. The MAC unit 20 shown in FIG. 1 can variably set the number of multipliers MUL and the like contained in each multiply-accumulate unit MAC by appropriate grouping in order to handle the numbers of various weight parameters, in other words, various kernel configurations and input sizes.

Figure 2B:
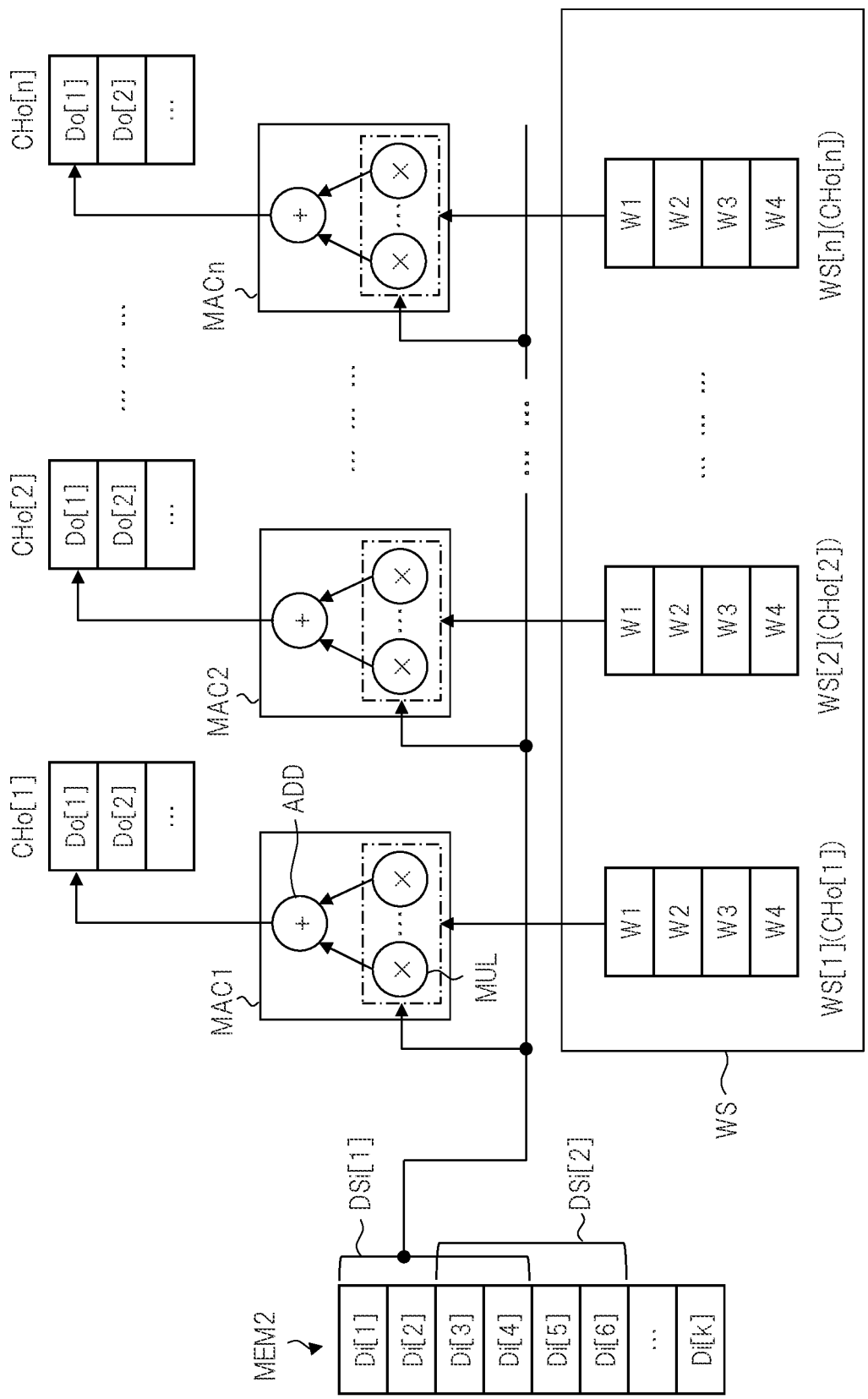
FIG. 2B is a schematic diagram showing an operation example different from FIG. 2A in the MAC unit of FIG. 1.

FIG. 2B is a schematic diagram showing an operation example of the MAC unit in FIG. 1, which is different from that in FIG. 2A. In FIG. 2B, unlike a case of FIG. 2A, shown is an operation example of a case where the n multiply-accumulate units MAC1 to MACn perform multiply-accumulate operations on the same input data set DSi and the mutually different weight parameter sets WS in a certain control cycle. The operation example of FIG. 2A and the operation example of FIG. 2B can be used properly by the input commands CMD1, CMD2, and the like.

As shown in FIG. 2B, in a certain control cycle, the same input data set DSi[1] is inputted in the n multiply-accumulate units MAC1 to MACn. Also, the different weight parameter sets WS[1], WS[2], ... WS[n] are inputted in the n multiply-accumulate units MAC1, MAC2, ..., MACn. The weight parameter sets WS[1], WS[2], ..., WS[n] correspond to the output channels CHo[1], CHo[2], ..., CHo[n], respectively.

The multiply-accumulate unit MAC1 multiply-accumulate operations on the four weight parameters W1 to W4 contained in the weight parameter set WS[1] of the output channel CHo[1], and the four pieces of input data Di[1] to Di[4] contained in the input data set DSi[1]. Consequently, the multiply-accumulate unit MAC1 generates the output data Do[1] of a first coordinate in the feature map of the output channel CHo[1]. In parallel with this, the multiply-accumulate unit MAC2 performs multiply-accumulate operations on the four weight parameters W1 to W4 contained in the weight parameter set WS[2] of the output channel CHo[2] and the four pieces of input data set Di[1] to Di[4] contained in the input data set DSi[1]. Consequently, the multiply-accumulate unit MAC2 generates the output data Do[1] of the first coordinate in the feature map of the output channel CHo[2].

In this way, when the data in the first pixel space, that is, the input data set DSi[1] is targeted and the processings in all the output channels are completed, the output data Do[1] of the first coordinate in all the feature maps is generated. Thereafter, the similar processings are performed by using the input data set DSi[2], that is, the data of the second pixel space instead of the input data set DSi[1]. As a result, the output data Do[2] of the second coordinates in all the feature maps is generated.

<Details of Neural Network Engine>

Figure 3:
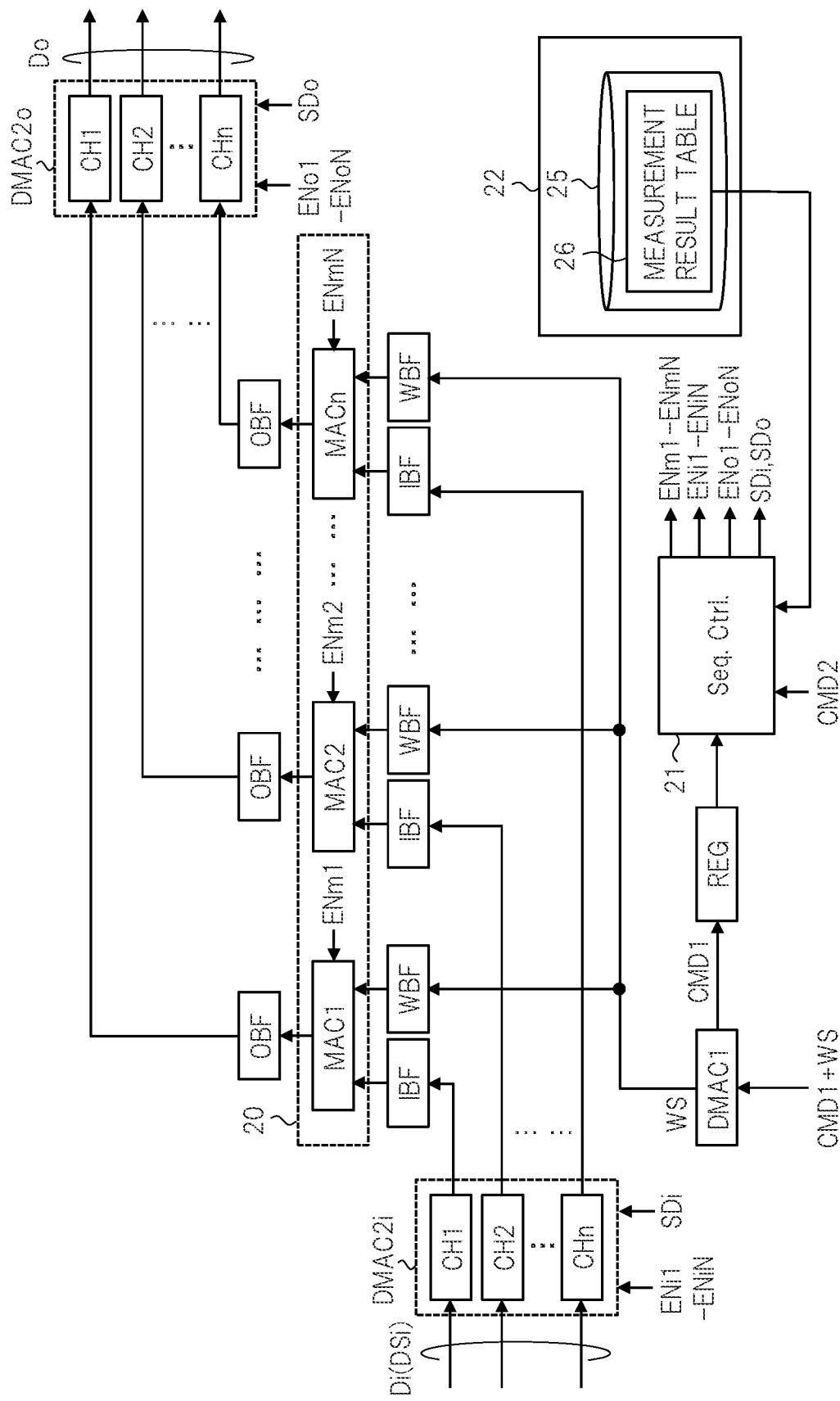
FIG. 3 is a diagram showing a detailed configuration example of a main part of a neural network engine in FIG. 1.

FIG. 3 is a diagram showing a detailed configuration example of a main part of the neural network engine in FIG. 1. In FIG. 3, the MAC unit 20 includes n multiply-accumulate units MAC1 to MACn. Each of the n multiply-accumulate units MAC1 to MACn includes a plurality of multipliers MUL and one adder ADD as described with reference to FIG. 2A. A data input buffer IBF, a weight parameter buffer WBF, and a data output buffer OBF are provided for each of the n multiply-accumulate units MAC1 to MACn. The n data input buffers IBF, weight parameter buffers WBF, and data output buffers OBF may be n data input registers, weight parameter registers, and data output registers, respectively.

The DMA controller DMAC1 transfers the weight parameter set WS from the memory MEM1 shown in FIG. 1 to each weight parameter buffer WBF and thus to each multiply-accumulate unit MAC. The DMA controller DMAC1 also transfers the input command CMD1 from the memory MEM1 to the register REG. Meanwhile, particularly, the data DMA controller DMAC2 shown in FIG. 1 has a data input DMA controller DMAC2i and a data output DMA controller DMAC2o as shown in FIG. 3.

The data input DMA controller DMAC2i transfers an input data set DSi made up of a plurality of pieces of input data Di to each of n data input buffers IBF and thus n multiply-accumulate units MAC1 to MACn by using n transfer channels CH1 to CHn. The data output DMA controller DMAC2o transfers the output data Do, which is outputted from the n multiply-accumulate units MAC1 to MACn and written to the n data output buffers OBF, by using the n transfer channels CH1 to CHn, respectively.

The measurement circuit 22 measures a degree of matching/mismatching of logic levels among the plurality of pieces of input data Di contained in the input data set DSi, and writes its measurement result to a measurement result table 26 in the memory 25. The memory 25 may be, for example, the memories MEM1, MEM2 shown in FIG. 1, or may be provided separately. The sequence controller 21 controls the data DMA controllers DMAC2i, DMAC2o and the n multiply-accumulate units MAC1 to MACn based on the input command CMD1 written in the register REG or the input command CMD2 from the processor 17 shown in FIG. 1 and on the measurement result by the measurement circuit 22, particularly, the measurement result table 26.

Particularly, the sequence controller 21 uses n enable signals ENm1 to ENmN to control ON/OFF of the n multiply-accumulate units MAC1 to MACn, in other words, activation/inactivation thereof, respectively. Furthermore, the sequence controller 21 uses n enable signals ENi1 to ENiN to control ON/OFF of the n transfer channels CH1 to CHn in the data input DMA controller DMAC2i, respectively.

Similarly, the sequence controller 21 uses n enable signals ENo1 to ENoN to control ON/OFF of the n transfer channels CH1 to CHn in the data output DMA controller DMAC2o, respectively. Incidentally, the multiply-accumulate unit MAC and the transfer channel, which are controlled by OFF, become power saving states, for example, by stopping the inputs of clock signals to internal flip-flops and the like.

Also, the sequence controller 21 uses a transfer setting signal SDi to set transfer contents for the n transfer channels CH1 to CHn in the data input DMA controller DMAC2i, particularly, for the transfer channels controlled by ON. Specifically, a transfer source address in the memory MEM2 is set and the like. Similarly, the sequence controller 21 uses a transfer setting signal SDo to set transfer contents for the n transfer channels CH1 to CHn in the data output DMA controller DMAC2o, particularly, for the transfer channels controlled by ON. Specifically, a transfer destination address in the memory MEM2 is set and the like.

<Details of Measurement Circuit>

Figure 4:
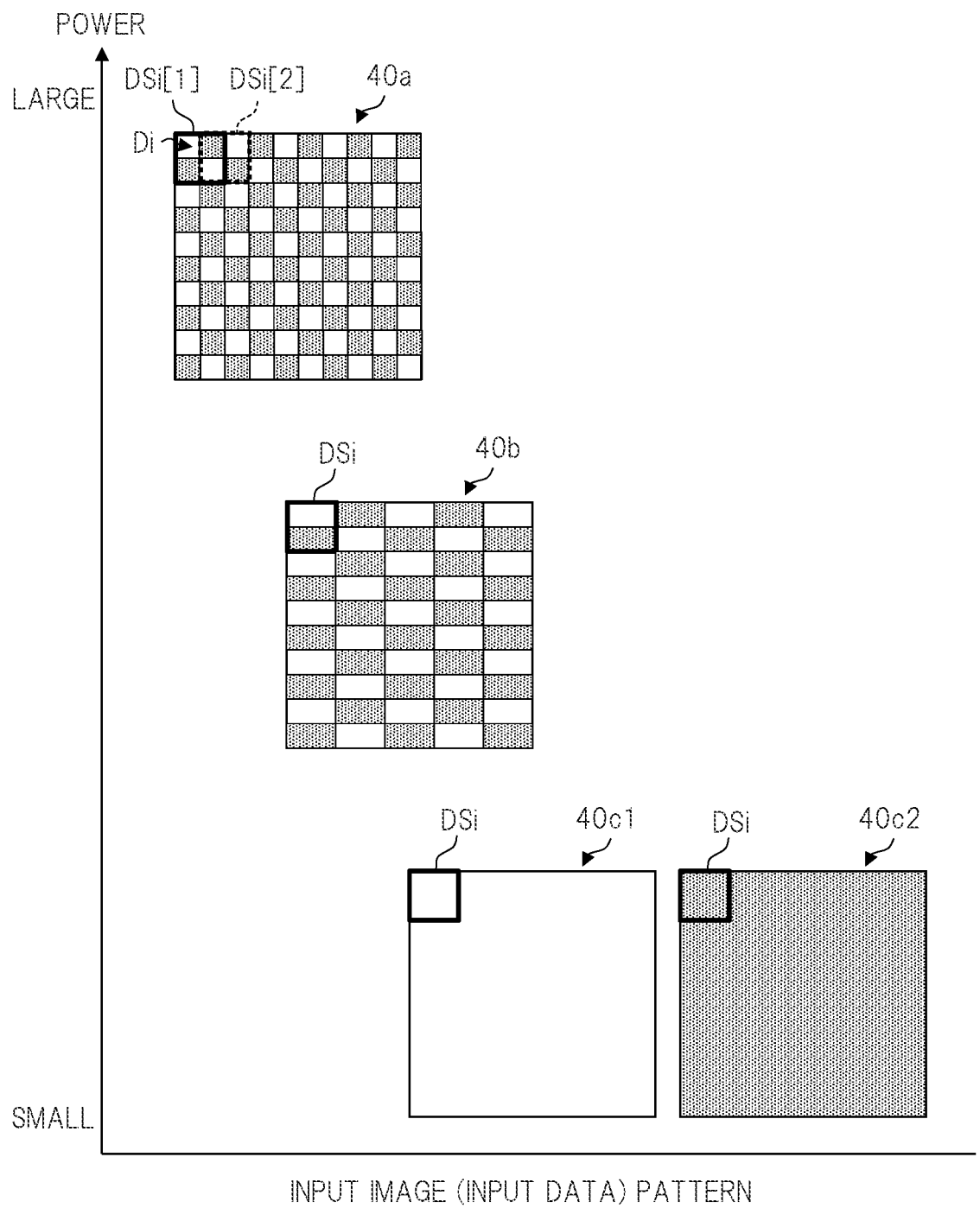
FIG. 4 is a schematic diagram showing one example of a relationship between a pattern of an input image and power.

FIG. 4 is a schematic diagram showing one example of a relationship between a pattern of an input image and power. For example, a camera image obtained by an in-vehicle camera or the like is written in the memory MEM1, and is copied in advance from the memory MEM1 to the memory MEM2 as described in FIG. 1. In FIG. 4, schematically shown is one example of such camera images 40a, 40b, 40c1, and 40c2. For example, the camera image 40a is composed of a plurality of input data sets DSi[1], DSi[2], .

. . as described above. Each input data set DSi is composed of a plurality of pieces of input data Di. Each piece of input data Di represents a pixel value.

In FIG. 4, the camera image 40a is composed of fine lattice patterns, the camera image 40b is composed of coarser lattice patterns than those of the camera image 40a, and the camera images 40c1, 40c2 are composed of solid patterns. In this case, a density change in the camera image increases in order of camera image 40a>camera image 40b>camera images 40c1, 40c2. Then, power consumption of the neural network engine 15 can increase as a density of the camera image changes greater.

A main reason for this is that the number of times of charge/discharge of each internal wiring and the like in the neural network engine 15 tends to increase when the camera images with the large density changes are processed. For example, if it is assumed that the input data Di, that is, a pixel value is 8 bits and the darkest pixel value is 0 (=0b00000000) and the brightest pixel value is 255 (=0b11111111), an 8-bit charge is required in changing the pixel value from 0 to 255 with the processing of the camera image 40a. Incidentally, as pixel resolution of the camera images with high performance is enhanced, that is, as a bit width of the pixel value increases, an amount of changes in power consumption corresponding to the density changes of the camera images can also become larger.

Figure 5:
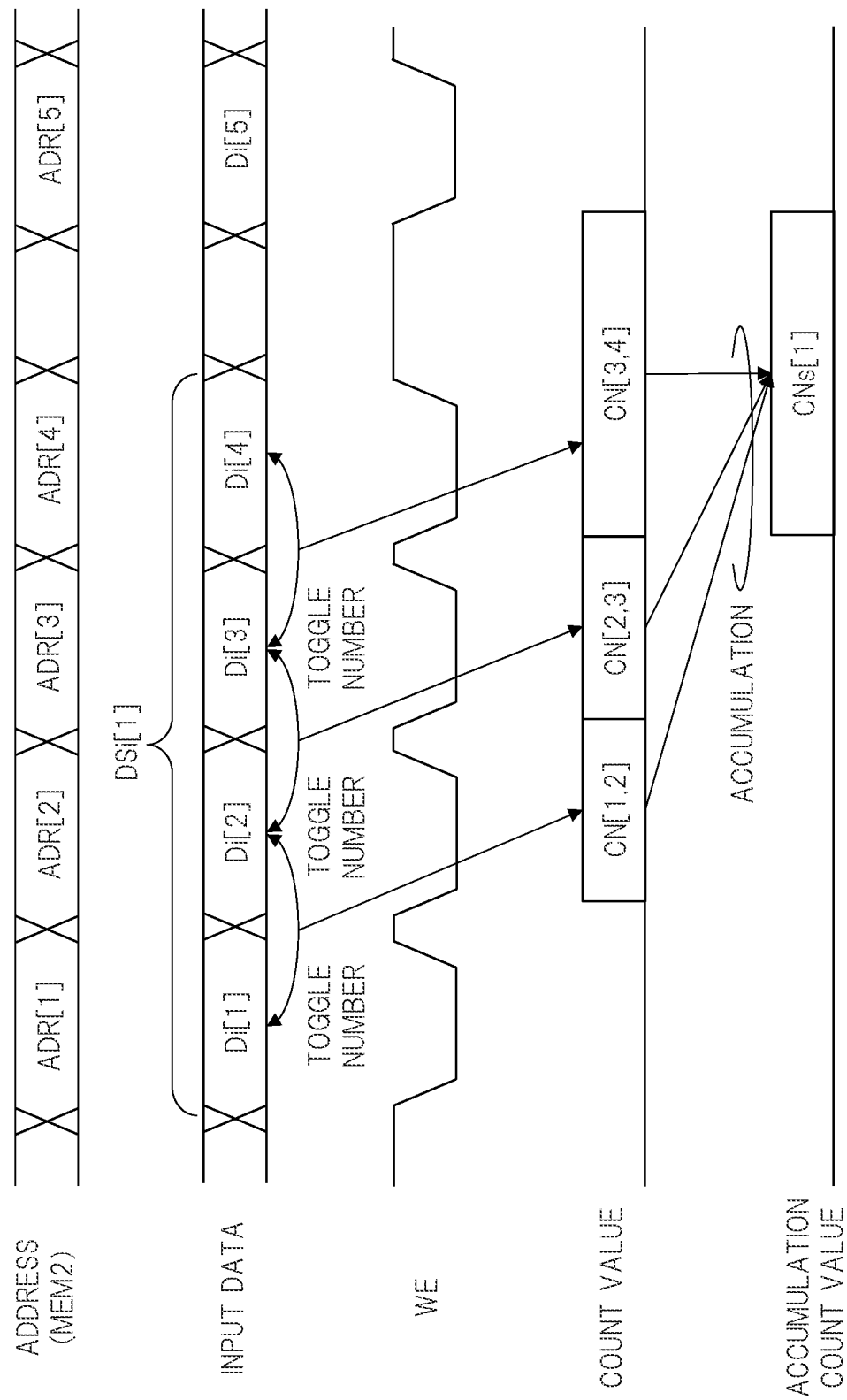
FIG. 5 is a waveform diagram showing an operation example of a measurement circuit in FIGS. 1 and 3.
Figure 6:
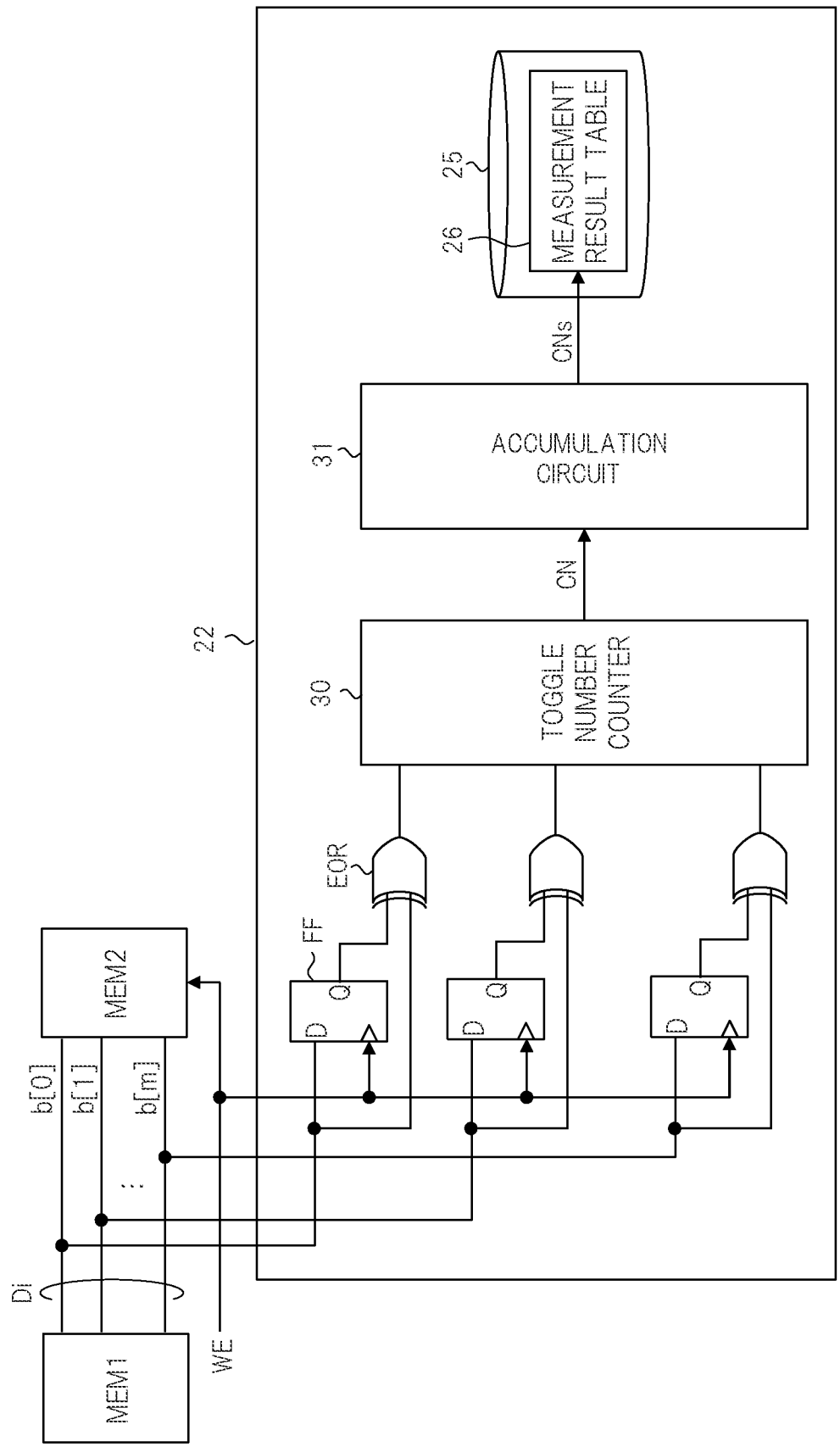
FIG. 6 is a circuit block diagram showing the configuration example of the measurement circuit in FIGS. 1 and 3.
Figures 7, 8:
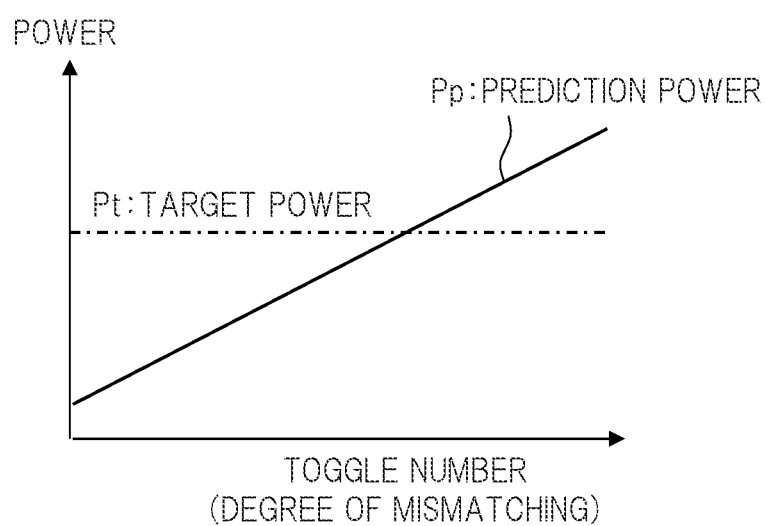
FIG. 7 is a diagram showing a configuration example of a measurement result table in FIG. 3.
FIG. 8 is a diagram for explaining an operation example of a sequence controller in FIGS. 1 and 3, and is a diagram showing one example of a correlation between the number of toggles and power in FIG. 7.

The measurement circuit 22 is provided to measure the degree of the density changes in such camera images. FIG. 5 is a waveform diagram showing an operation example of the measurement circuit in FIGS. 1 and 3. FIG. 6 is a circuit block diagram showing a configuration example of the measurement circuit in FIGS. 1 and 3. FIG. 7 is a diagram showing a configuration example of the measurement result table in FIG. 3.

As shown in FIGS. 5 and 6, the measurement circuit 22 measures a degree of matching/mismatching of logic levels among the plurality of pieces of input data Di when the plurality of input data sets DSi constituting the camera images and the like are copied from the memory MEM1 to the memory MEM2. Incidentally, the copying from the memory MEM1 to the memory MEM2 is performed by, for example, the processor 17 shown in FIG. 1.

More particularly, the measurement circuit 22 counts the number of toggles in a logic level that occur between two adjacent pieces of input data Di when the plurality of pieces of input data Di are sequentially written to the memory MEM2, thereby measuring the degree of the logic level in matching/mismatching between the plurality of pieces of input data Di. Then, the measurement circuit 22 writes the measurement results into the measurement result table 26.

In the example of FIG. 5, the input data Di[1], Di[2], Di[3], Di[4], . . . are written sequentially to addresses ADR[1], ADR[2], ADR[3], ADR[4], . . . of the memory MEM2. The input data Di[1] to Di[4] constitute an input data set DSi[1]. Also, the input data Di is constituted by "m+1" bits, for example, 8 bits, 16 bits, 24 bits, or the like as shown in FIG. 6.

In FIG. 5, the measurement circuit 22 counts the number of toggles in a logical level which occur between the "m+1"-bit input data Di[1] and the "m+1"-bit input data Di[2], thereby calculating a count value CN[1, 2]. Similarly, the measurement circuit 22 calculates a count value CN[2, 3] targeting the input data Di[2] and the input data Di[3], and calculates a count values CN[3, 4] targeting the input data Di[3] and the input data Di[4]. Then, the measurement circuit 22 accumulates the calculated count value CN[1, 2], CN[2, 3], and [3, 4], thereby calculating an accumulated count value CNs[1]. The accumulated count value CNs[1] represents the number of toggles targeting the input data set DSi[1].

In FIG. 6, the measurement circuit 22 includes "m+1" flip-flops FF, "m+1" exclusive OR gates EOR, a toggle number counter 30, and an accumulation circuit 31. The "m+1" flip-flops FF, for example, delay the "m+1"-bit input data Di by one write cycle in synchronization with a write enable signal WE to the memory MEM2. The "m+1" exclusive OR gates EOR compare the matching/mismatching between the "m+1"-bit input data Di in the current write cycle and the "m+1"-bit input data Di in the previous write cycle from the flip-flop FF for each bit.

The toggle number counter 30 counts the number of mismatched bits, that is, the number of toggles based on an output from the exclusive OR gate EOR, thereby counting the count value CN. The accumulation circuit 31 accumulates the count value CN from the toggle number counter 30 in time series, thereby calculating the accumulated count value CNs. Then, the accumulation circuit 31 writes the accumulated count value CNs to the measurement result table 26 as the measurement result. In an example of FIG. 7, the measurement result table 26 stores the number of toggles for each input data set DSi[1], DSi[2], . . . , DNs[j], that is, the accumulated count values CNs[1], CNs[2], . . . , CNs[j].

<Details of Sequence Controller>

FIG. 8 is a diagram for explaining an operation example of the sequence controller in FIGS. 1 and 3, and is a diagram showing an example of a correlation between the number of toggles and power in FIG. 7. In FIG. 8, as shown by prediction power Pp, the sequence controller 21 predicts that the power consumption increases as the number of toggles increases, that is, as a degree of mismatching of logic levels among the plurality of pieces of input data Di becomes larger. In an example of FIG. 8, the sequence controller 21 predicts that the power consumption will increase in proportion to the number of toggles.

As a specific example, it is assumed that the operation as shown in FIG. 2A is performed in a certain control cycle. At this time, in a normal operation, the n multiply-accumulate units MAC1 to MACn are assumed to set the n input data sets DSi[1] to DSi[n] as inputs and perform operations in parallel with them. In this case, the sequence controller 21 acquires the measurement results for the n input data sets DSi[1] to DSi[n] from the measurement result table 26, that is, acquires n trigger numbers. Then, the sequence controller 21 totals the acquired n trigger numbers, thereby calculating trigger numbers for the control cycle and predicting the power consumption generated in the control cycle from the calculated trigger numbers.

Meanwhile, for the semiconductor device 10 mounting the neural network engine 15, for example, the allowable maximum power may be determined in advance according to a power supply specification, a temperature specification, and the like of the vehicle system and the like mounting the semiconductor device 10. In the sequence controller 21, for example, the allowable maximum power in the neural network engine 15 is set as target power Pt based on the allowable maximum power of the semiconductor device 10. Then, when the prediction power Pp exceeds the target power Pt in a certain control cycle, the sequence controller 21 controls a reduction in the number of parallel processings by the n multiply-accumulate units MAC1 to MACn so that the prediction power Pp approaches the target power Pt within a range that does not exceed the target power Pt.

For example, if the prediction power Pp in one control cycle is twice the target power Pt, the sequence controller 21 reduces the number of parallel processings by the n multiply-accumulate units MAC1 to MACn to n/2. Then, the sequence controller 21 time-divides the one control cycle into two control cycles, thereby causing the neural network engine 15 to perform necessary processings. This makes it possible to enhance the processing efficiency of the neural network within a range of the allowable power consumption. That is, while the prediction power Pp is suppressed within the range of the target power Pt, the number of parallel processings is excessively decreased and thus an excessive increase in the processing time of the neural network can be avoided.

Figure 9:
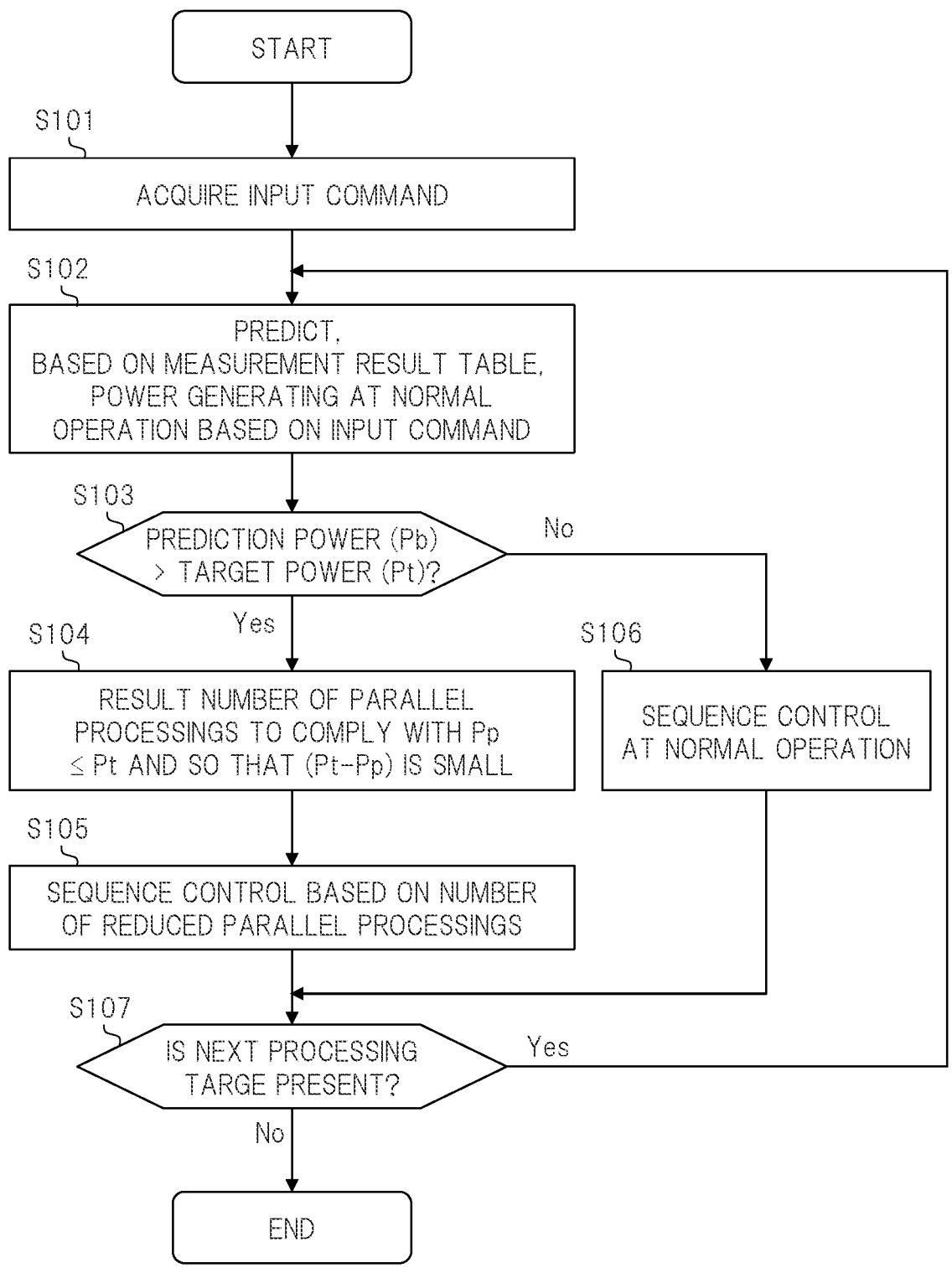
FIG. 9 is a flowchart showing one example of processing contents of the sequence controller in FIGS. 1 and 3.

FIG. 9 is a flowchart showing one example of the processing contents of the sequence controller in FIGS. 1 and 3. First, prior to a processing shown in FIG. 9, the processor 17 copies the plurality of input data sets DSi from the memory MEM1 to the memory MEM2 as described in, for example, FIGS. 5, 6 and 7. At this time, the measurement circuit 22 measures the degree of matching/mismatching of the logic level among the plurality of pieces of input data Di as a trigger number, and writes the measurement result in the measurement result table 26.

After such processings has been performed in advance, the sequence controller 21 performs processings as shown in FIG. 9. In FIG. 9, the sequence controller 21 acquires the input command CMD1 written in the register REG or the input command CMD2 from the processor 17 (step S101). The input commands CMD1, CMD2 determine, for example, the number of parallel processings when the certain convolutional layer is processed in a normal operation, and also determine the control contents of the DMA controller MAC2 and the n multiply-accumulate units MAC1 to MACn according to the number of parallel processings.

Thereafter, the sequence controller 21 repeatedly performs the processings of step S102 to S106 in unit of predetermined control until processings of all processing targets, for example, all the input data sets DSi are completed (step S107). In step S102, the sequence controller 21 predicts the power consumption, which occurs during the normal operation based on the input commands CMD1, CMD2, based on the measurement result table 26 (step S102).

Specifically, as described with reference to FIG. 8, the sequence controller 21 acquires the measurement result for the input data set DSi to be processed from the measurement result table 26, that is, acquires the trigger number before operating the DMA controller DMAC2 and the n multiply-accumulate units MAC1 to MACn based on the input commands CMD1, CMD2. Then, the sequence controller 21 predicts the power consumption, which is generated when the DMA controller DMAC2 and the n multiply-accumulate units MAC1 to MACn are normally operated based on the input commands CMD1, CMD2, based on the acquired measurement results.

Next, the sequence controller 21 determines whether the prediction power Pp exceeds the preset target power Pt (step S103). If "prediction power Pp≤ target power Pt" (step S103: No), the sequence controller 21 controls the DMA controller DMAC2 and the n multiply-accumulate units MAC1 to MACn by the control contents at a normal operation based on the input commands CMD1, CMD2.

Meanwhile, if "prediction power Pp>target power Pt" (step S103: Yes), the sequence controller 21 reduces the number of parallel processings by the n multiply-accumulate units MAC1 to MACn so that the prediction power Pp approaches the target power Pt within a range not exceeding the target power Pt (step S104). Then, the sequence controller 21 performs sequence control based on the number of reduced parallel processings (step S105). Specifically, the sequence controller 21 controls the DMA controller DMAC2 and the n multiply-accumulate units MAC1 to MACn so that necessary processings are performed in a time-sharing manner.

Figure 10A:
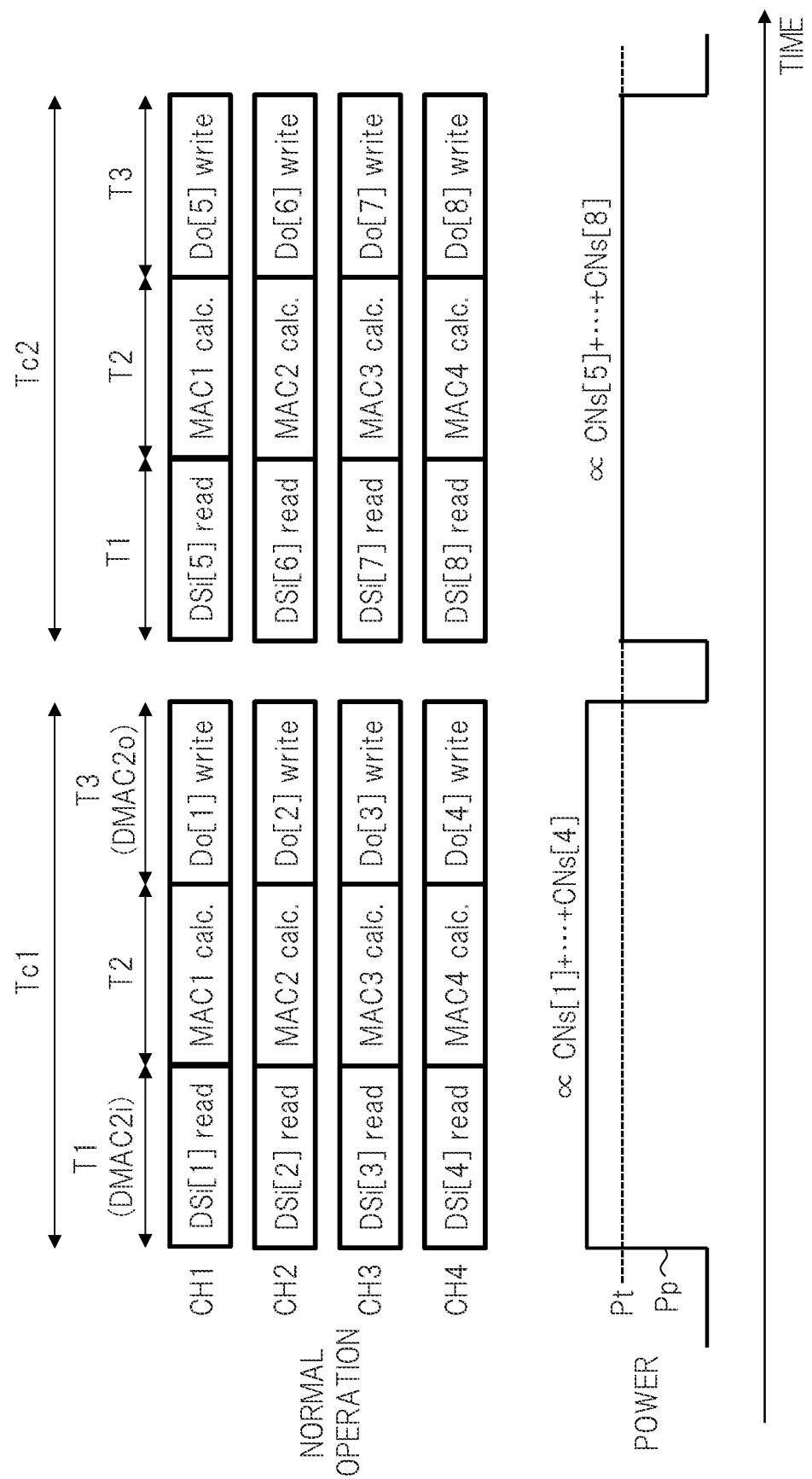
FIG. 10A is a timing chart showing one example of a normal operation and one example of a power state associated with the operation in the neural network engine shown in FIGS. 1 and 3.

FIG. 10A is a timing chart showing one example of a normal operation and one example of a power state associated with a normal operation in the neural network engine shown in FIGS. 1 and 3. In this example, to simplify the explanation, it is assumed that the number "n" of multiply-accumulate units MAC is four and that the four multiply-accumulate units MAC1 to MACn perform operations in parallel during the normal operation. In FIG. 10A, the neural network engine 15 performs a processing in a first control cycle Tc1, and subsequently performs a processing in a second control cycle Tc2. In the specification, the control cycles Tc1, Tc2 are collectively referred to as control cycles Tc. The respective control cycles Tc are composed of periods T1, T2, T3.

In the period T1, the data input DMA controller DMAC2i uses the four transfer channels CH1 to CH4 to transfer the four input data sets DSi in parallel to the four multiply-accumulate units MAC1 to MAC4, in detail, to each data input buffer IBF from the memory MEM2. The DMA controller DMAC1 also transfers the weight parameter set WS to the four multiply-accumulate units MAC1 to MAC4, particularly, to each weight parameter buffer WBF from the memory MEM1.

In the period T2, the four multiply-accumulate units MAC1 to MAC4 perform multiply-accumulate operations on the transferred input data set DSi and the transferred weight parameter set WS in parallel. In the period T3, the data output DMA controller DMAC2o uses the four transfer channels CH1 to CH4 to transfer the four pieces of output data Do to be a multiply-accumulate operation result in parallel from each data output buffer OBF of the four multiply-accumulate units MAC1 to MAC4 to the memory MEM2.

Also, prior to the period T1, the sequence controller 21 uses a transfer setting signal SDi to set the transfer contents for the four transfer channels CH1 to CH4 in the data input DMA controller DMAC2i. Similarly, the sequence controller 21 uses a transfer setting signal SDo to set the transfer contents for the four transfer channels CH1 to CH4 in the data output DMA controller DMAC2o.

Then, in the period T1, the sequence controller 21 uses four enable signals ENi1 to ENi4 to control all the four transfer channels CH1 to CHn in the data input DMA controller DMAC2i so as to become ON. Consequently, the input data set DSi is transferred by using the four transfer channels CH1 to CH4. In addition, in the period T2, the sequence controller 21 uses four enable signals ENm1 to ENm4 to control all the four multiply-accumulate units MAC1 to MAC4 so as to become ON. Consequently, the four multiply-accumulate units MAC1 to MAC4 perform the multiply-accumulate operations.

Further, in the period T3, the sequence controller 21 uses four enable signals ENo1 to ENo4 to control all the four transfer channels CH1 to CHn in the data output DMA controller DMAC2o so as to become ON. Consequently, the output data Do is transferred by using the four transfer channels CH1 to CH4.

Here, in a first control cycle Tc1 in FIG. 10A, the four multiply-accumulate units MAC1 to MAC4 uses four input data sets DSi[1] to DSi[4] as inputs to output four pieces of output data Do[1] to Do[4]. The power consumption when the input data sets DSi[1] to DSi[4] are targets to be processed are predicted by a total value of accumulation count values CNs[1] to CNs[4] for the input data sets DSi[1] to DSi[4]. In this example, the prediction power Pp based on the total value has exceeded the target power Pt.

Meanwhile, in a second control cycle Tc2 in FIG. 10A, the four multiply-accumulate units MAC1 to MAC4 use the four input data sets DSi[5] to DSi[8] as inputs to output four pieces of output data Do [5] to Do[8]. The power consumption when the input data sets DSi[5] to DSi[8] are targets to be processed are predicted by a total value of accumulation count values CNs[5] to CNs[8] for the input data sets DSi[5] to DSi[8]. In this example, the prediction power Pp based on the total value has not exceeded the target power Pt.

Figure 10B:
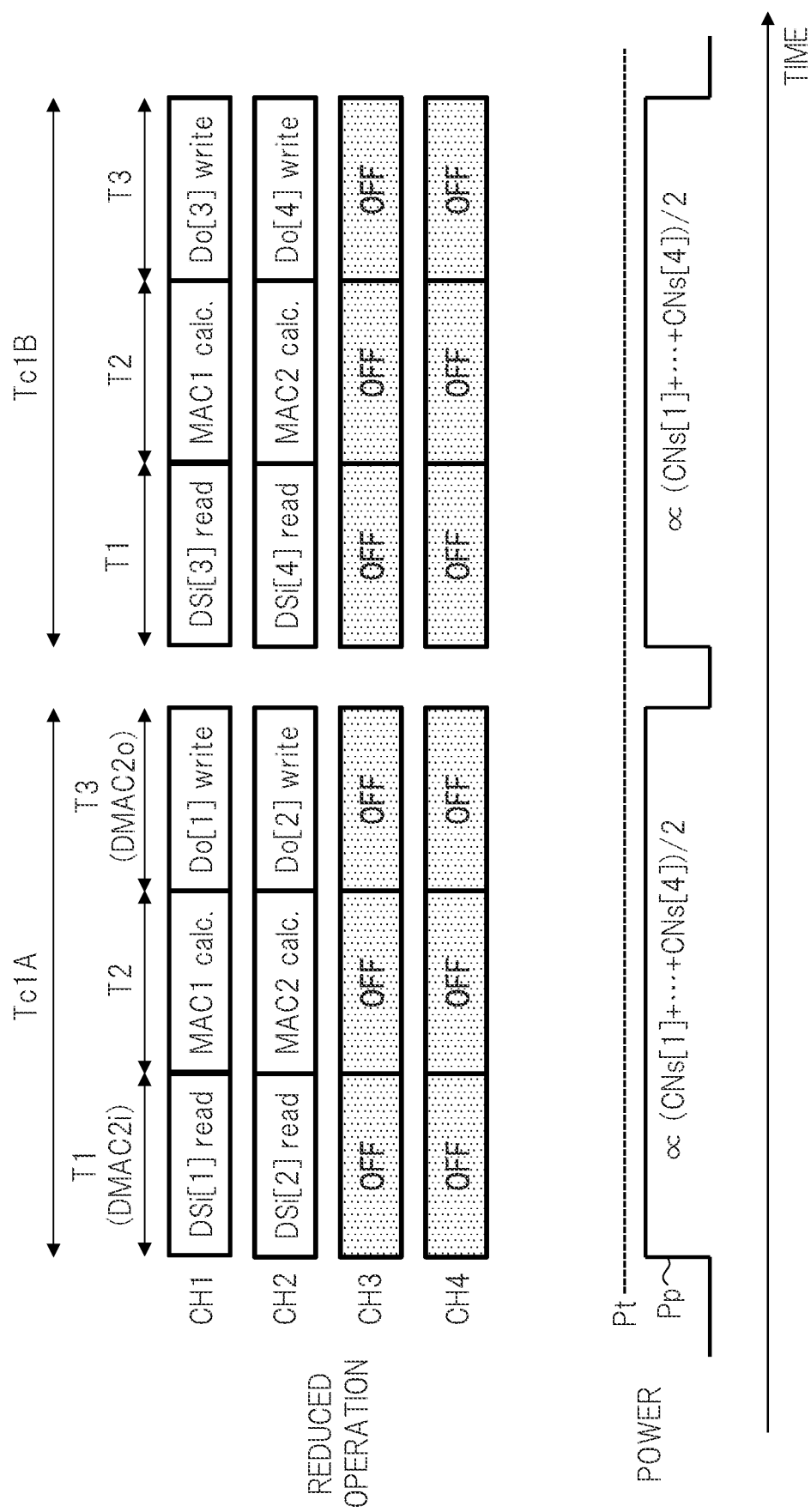
FIG. 10B is a timing chart showing an example of an operation after reducing the number of parallel processings and one example of a power state associated with the operation with reference to FIG. 10A.

FIG. 10B is a timing chart showing one example of an operation after reducing the number of parallel processings and one example of a power state associated with the operation with reference to FIG. 10A. The prediction power Pp in the first control cycle Tc1 in FIG. 10A exceeds the target power Pt. Therefore, the sequence controller 21 reduces the number of parallel processings by the multiply-accumulate units MAC through the processings of steps S104 and S105 in FIG. 8 and, correspondingly, reduces the number of transfer channels of the DMA controller DMAC2 either.

In this example, one control cycle Tc1 in FIG. 10A is time-divided into two control cycles Tc1A, Tc1B in FIG. 10B. In the two control cycles Tc1A, Tc1B, the number of parallel processings by the multiply-accumulate units MAC is reduced from four to two. In the control cycle Tc1A, the two multiply-accumulate units MAC1, MAC2 use the two input data sets DSi[1], DSi[2] as inputs to output the two pieces of output data Do[1], Do[2]. In the control cycle Tc1B, the two multiply-accumulate units MAC1, MAC2 use the two input data sets DSi[3], DSi[4] as inputs to output the two pieces of two output data Do[3], Do[4].

At this time, the sequence controller 21 uses the enable signals ENm1, ENm2 to control the two multiply-accumulate units MAC1, MAC2 so as to become ON, and uses the enable signals ENi1, ENi2, ENo1 and ENo2 to control the two transfer channels CH1, CH2 so as to become ON. Also, the sequence controller 21 uses the enable signals ENm3, ENm4 to control the two multiply-accumulate units MAC3, MAC4 so as to become OFF, and uses the enable signals ENi3, ENi4, ENo3 and ENo4 to control the two transfer channels CH3, CH4 so as to become OFF.

The multiply-accumulate units MAC3, MAC4 and the transfer channels CH3, CH4 that have been controlled so as to become OFF become inactive states, and become power saving states by, for example, an input of the clock signal to the internal flip-flop and the like being stopped and the like. In this way, by reducing the number of parallel processings of the multiply-accumulate units MAC to, for example, 1/q, ideally, the prediction power Pp can be reduced to 1/q, for example, ½.

As a result, as shown in FIG. 10B, the prediction power Pp in the control cycles Tc1A, Tc1B has a magnitude close to the target power Pt within the range of the target power Pt. Incidentally, although illustration is omitted, the processing of step S106 in FIG. 8 is performed in the next control cycle Tc. That is, the processing in the control cycle Tc2 shown in FIG. 10A is performed by using the four multiply-accumulate units MAC1 to MAC4.

<About Modification Example [1]>

In the examples shown in FIGS. 7, 10A, and 10B, the number of toggles is measured for each input data set DSi and, based on this, the power consumption is predicted for each control cycle Tc and the number of parallel processings has been controlled for each control cycle Tc. However, a unit or the number of input data sets in measuring the number of toggles, and a unit or the number of control cycles in predicting the power consumption and in controlling the number of parallel processings can be changed appropriately.

For example, in FIG. 10A, the number of one toggle is measured with the four input data sets DSi[1] to DSi[4] used as a measurement unit, and prediction of the power consumption and control of the number of parallel processings may be performed based on the number of one toggle. At this time, for example, the ten pieces of input data Di[1] to Di[10] contained in the four input data sets DSi[1] to DSi[4] of FIG. 2A are used as targets, and the number of one trigger may simply be measured by performing a counting operation as shown in FIG. 5.

Similarly, in FIG. 10A, the number of one toggle is measured with the eight input data sets DSi[1] to DSi[8] used as a measurement unit, and prediction of the power consumption and control of the number of parallel processings may be performed in units of two control cycles Tc1, Tc2 based on the number of one toggle. Furthermore, the number of one toggle may be measured by using all the input data sets DSi, which form one camera image, as a unit of measurement. In this case, the prediction of the power consumption and the control of the number of parallel processings are performed in units of all the control cycles Tc necessary for a processing of one convolutional layer with one camera image used as an input based on the number of one toggle. That is, the control of the number of parallel processings is performed for each convolutional layer.

Normally, the smaller the number of input data sets DSi which is a unit for measuring the number of toggles and the number of control cycles Tc which is a unit for controlling the number of parallel processings, the more detailed control becomes possible and, within the range of allowable power consumption, the processing efficiency of the neural network can be enhanced. However, then again, the control operation by the sequence controller 21 is complicated, and an increase in a circuit area of the sequence controller 21, an increase in the processing time, and the like may be incurred.

Meanwhile, if the unit of measurement of the number of toggles or the unit of control of the number of parallel processings increases, the processing efficiency of the neural network may only be enhanced to a certain extent, but this can simplify the control operation by the sequence controller 21 and may further make it easier to optimize the number of parallel processings. For example, in FIG. 10A, in using the four multiply-accumulate units MAC1 to MAC4 to process the twelve input data sets DSi[1] to DSi[12] in three control cycles Tc, this processing makes it possible to be changed and the like to the processings in the four control cycles Tc using the three multiply-accumulate units MAC1 to MAC3. The unit of measurement of the number of toggles and the unit of control of the number of parallel processings may be determined appropriately in consideration of these.

<About Modification Example [2]>

In the configuration example and the operation example described so far, the sequence controller 21 predicts, based on the measurement result table 26, the power consumption when the operation is performed based on the input command before change, and when the prediction power Pp>target power Pt, a decision has been made to reduce the number of parallel processings. Then, the sequence controller 21 has controlled the DMA controller DMAC2 and the multiply-accumulate units MAC based on the number of reduced parallel processings. However, the prediction of the power consumption and the reduction in the number of parallel processings may be determined by the processor 17 instead of the sequence controller 21.

In particular, as described in the modification example [1], when the unit for control of the number of parallel processings is performed for each convolutional layer, the processor 17 refers to, for example, the measurement result table 26 written in the memory MEM1 and the like, which may thereby predict the power consumption in a case where the processing of the convolution layer is performed based on the input command before the change. When prediction power Pp>target power Pt, the processor 17 reduces the number of parallel processings so that the prediction power Pp approaches the target power Pt within the range of the target power Pt. Then, the processor 17 may output, to the sequence controller 21, the changed input command CMD2 reflecting the number of reduced parallel processings.

The sequence controller 21 controls the number of parallel processings by the n multiply-accumulate units MAC based on the changed input command CMD2 from the processor 17. That is, the sequence controller 21 controls the DMA controller DMAC2 and the multiply-accumulate units MAC so as to operate with the number of parallel processings indicated by the changed input command CMD2. Incidentally, in this case, the processor 17 for example, requests the neural network engine 15 to perform the processing in the convolutional layer by the output of the input command CMD2, and can perform another processing in parallel with the processing in the neural network engine 15 relative to this.

<Main Effects of First Embodiment>

As described above, in a method of the first embodiment, the measurement circuit 22 is provided to measure the degree of matching/mismatching of a logic level among the plurality of pieces of input data Di, and the power consumption is predicted based on the measurement result by the measurement circuit 22. Then, the number of parallel processings by the multiply-accumulate units MAC is controlled so that the prediction power Pp approaches the target power Pt within the range not exceeding the target power Pt. This makes it possible to enhance the processing efficiency of the neural network, for example, shorten the processing time within a range of the allowable power consumption. Also, for example, in a vehicle system or the like, it is possible to improve efficiency of the processing for each camera image according to image contents, image quality, and the like thereof.

Second Embodiment

<Outline of Semiconductor Device>

Figure 11:
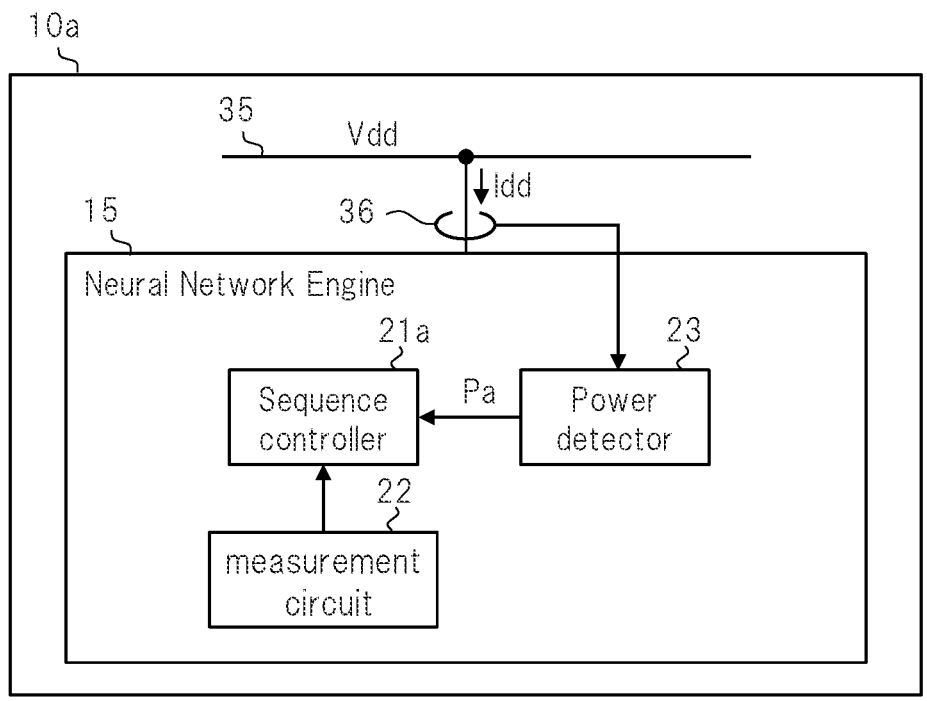
FIG. 11 is an outline diagram showing a configuration example of a main part in a semiconductor device according to a second embodiment.
Figure 12:
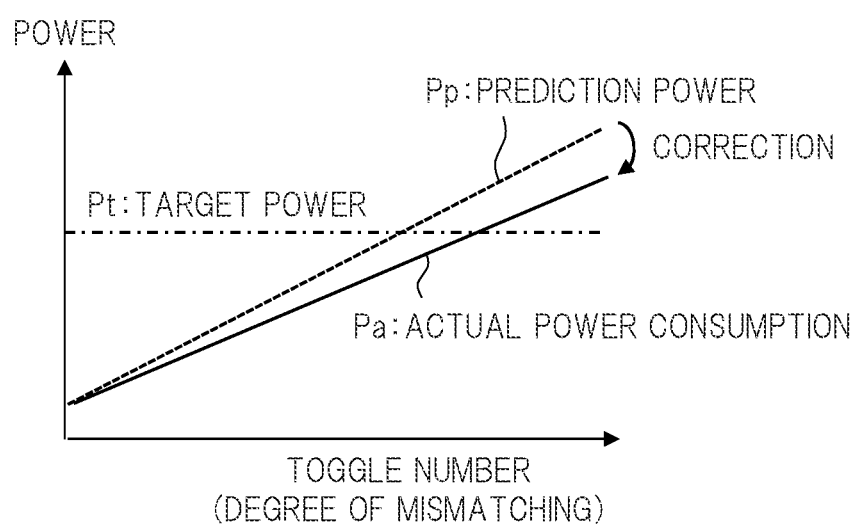
FIG. 12 is a diagram for explaining an operation example of a sequence controller in FIG. 11, and is a diagram showing one example of a correlation between the number of toggles and power.

FIG. 11 is a schematic diagram showing a configuration example of a main part in a semiconductor device according to a second embodiment. FIG. 12 is a diagram for explaining an operation example of a sequence controller in FIG. 11, and is a diagram showing one example of a correlation between the number of toggles and power. A semiconductor device 10a shown in FIG. 11 has the same configuration as that in FIG. 1. However, in FIG. 11, a part of the configuration in FIG. 1 is extracted and shown for simplification of explanation. Here, a difference from FIG. 1 will be described.

A semiconductor device 10a shown in FIG. 11 further includes a current sensor 36 and a power detector 23 in addition to the various configurations shown in FIG. 1. The current sensor 36 is inserted into a power supply line 35 of the semiconductor device 10a, in this example, the neural network engine 15, and detects a consumption current Idd of the semiconductor device 10a, in this example, the neural network engine 15. The power detector 23 is mounted in, for example, the neural network engine 15, and detects power consumption Pa of the semiconductor device 10a, in this example, the neural network engine 15 based on the consumption current Idd detected by the current sensor 36 and a power supply voltage Vdd.

Based on the actual power consumption Pa detected by the power detector 23, as shown in FIG. 12, the sequence controller 21a corrects the degree of mismatching of the logic levels among the plurality of pieces of input data Di described in FIG. 8, that is, the correlation between the number of toggles and the prediction power Pp. Then, the sequence controller 21a performs the processing and the like of step S102 in FIG. 9 based on the corrected prediction power Pp.

<Main Effects of Second Embodiment>

As described above, using a method of the second embodiment makes it possible to obtain the same various effects as those described in the first embodiment. Further, by providing the power detector 23 and correcting the prediction power Pp based on its detection result, it is possible to improve prediction accuracy of the power consumption based on the number of triggers. That is, the correlation between the number of triggers and the actual power consumption may change appropriately depending on usage environment of the semiconductor device 10a, for example, temperature etc., and variations etc. in the manufacturing process. Using the method of the second embodiment makes it possible to predict the power consumption by reflecting such variable factors.

The invention made by the present inventor(s) has been specifically described above based on the embodiments, but the present invention is not limited to the above embodiments and, needless to say, various modifications can be made without departing from the gist of the invention.

What is claimed is:

1. A semiconductor device performing a processing of a neural network, comprising:
    a first memory storing a plurality of weight parameter sets composed of a plurality of weight parameters;
    a second memory storing a plurality of input data sets composed of a plurality of pieces of input data;
    n multiply-accumulate units capable of performing parallel processings, where n is an integer equal to or greater than 2, each performing a multiply-accumulate operation on any of the plurality of weight parameter sets and any of the plurality of input data sets;
    a first DMA (Direct Memory Access) controller transferring the one or more weight parameter sets from the first memory to the n multiply-accumulate units;
    a second DMA controller transferring the one or more input data sets from the second memory to the n multiply-accumulate units;
    a sequence controller controlling the second DMA controller and the n multiply-accumulate units based on an input command; and
    a measurement circuit,
    wherein the measurement circuit measures a degree of matching/mismatching of a logic level among the plurality of pieces of input data contained in the input data set within the second memory, and wherein the sequence controller controls the number of parallel processings by the n multiply-accumulate units based on a measurement result of the measurement circuit.

2. The semiconductor device according to 1,
wherein the first memory further stores the plurality of input data sets,
wherein the second memory is a memory faster than the first memory, and is used as a cache memory for the n multiply-accumulate units,
wherein the plurality of input data sets are copied in advance from the first memory to the second memory, and
wherein the measurement circuit measures a degree of matching/mismatching of a logic level among the plurality of pieces of input data in copying the input data set from the first memory to the second memory, and writes a measurement result to a measurement result table.

3. The semiconductor device according to claim 2,
wherein the sequence controller acquires a measurement result for the input data set to be processed from the measurement result table before operating the second DMA controller and the n multiply-accumulate units based on the input command, and controls a number of parallel processings by the n multiply-accumulate units based on the acquired measurement result.

4. The semiconductor device according to 2,
wherein the measurement circuit counts a number of toggles in logic level, which occur between the two adjacent pieces of input data when the plurality of pieces of input data are sequentially written to the second memory, thereby measuring a degree of matching/mismatching of a logic level among the plurality of pieces of input data.

5. The semiconductor device according to claim 1,
wherein the sequence controller: predicts, based on the measurement result by the measurement circuit, power consumption generated when the second DMA controller and the n multiply-accumulate units are operated based on the input command; reduces the number of parallel processings by the n multiply-accumulate units so that when prediction power exceeds predetermined target power, the prediction power approaches the target power within a range not exceeding the target power; and controls the second DMA controller and the n multiply-accumulate units so that a necessary processing is performed in a time-sharing manner.

6. The semiconductor device according to 5,
wherein the sequence controller predicts that power consumption increases as the degree of mismatching of logic level among the plurality of pieces of input data becomes higher.

7. The semiconductor device according to claim 6, further comprising a power detector for detecting power consumption of the semiconductor device,
wherein the sequence controller corrects a correlation between the degree of mismatching of the logic level among the plurality of pieces of input data and the predicted power consumption based on a detection result of the power detector.

8. A semiconductor device configured by one semiconductor chip, comprising:
a neural network engine performing a neural network processing;
a first memory storing a plurality of weight parameter sets composed of a plurality of weight parameters;
a second memory storing a plurality of input data sets composed of a plurality of pieces of input data;
a processor, and
a bus interconnecting the neural network engine, the first memory, the second memory, and the processor,
wherein the neural network engine includes:
n multiply-accumulate units capable of performing parallel processings, where n is an integer equal to or greater than 2, each performing a multiply-accumulate operation on any of the plurality of weight parameter sets and any of the plurality of pieces of input data sets;
a first DMA (Direct Memory Access) controller transferring the one or more weight parameter sets from the first memory to the n multiply-accumulate units;
a second DMA controller transferring the one or more input data sets from the second memory to the n multiply-accumulate units;
a sequence controller controlling the second DMA controller and the n multiply-accumulate units based on an input command; and
a measurement circuit,
wherein the measurement circuit measures a degree of matching/mismatching of a logic level among the plurality of pieces of input data contained in the input data set within the second memory, and
wherein the sequence controller controls a number of parallel processings by the n multiply-accumulate units based on a measurement result of the measurement circuit.

9. The semiconductor device according to claim 8,
wherein the first memory further stores the plurality of input data sets,
wherein the second memory is a memory faster than the first memory, and is used as a cache memory for the neural network engine,
wherein the processor copies the plurality of input data sets from the first memory to the second memory in advance, and
wherein the measurement circuit measures the degree of matching/mismatching of the logic level among the plurality of pieces of input data when the plurality of input data sets are copied from the first memory to the second memory, and writes the measurement result to the measurement result table.

10. The semiconductor device according to claim 9,
wherein the sequence controller acquires a measurement result for the input data set to be processed from the measurement result table before operating the second DMA controller and the n multiply-accumulate units based on the input command, and controls the number of parallel processings by the n multiply-accumulate units based on the acquired measurement result.

11. The semiconductor device according to claim 9,
wherein the measurement circuit counts a number of toggles in logic level, which occur between the two adjacent pieces of input data when the plurality of pieces of input data are sequentially written to the second memory, thereby measuring the degree of matching/mismatching of the logic level.

12. The semiconductor device according to claim 8,
wherein the sequence controller: predicts, based on the measurement result by the measurement circuit, power consumption generated when the second DMA controller and the n multiply-accumulate units are operated based on the input command; reduces the number of parallel processings of the n multiply-accumulate units so that when prediction power exceeds predetermined target power, the power consumption approaches the target power within a range not exceeding the target power; and controls the second DMA controller and the n multiply-accumulate units so that a necessary processing is performed in a time-sharing manner.

13. The semiconductor device according to claim 12, wherein the sequence controller predicts that power consumption increases as the degree of mismatching of the logic level among the plurality of pieces of input data becomes higher.

14. The semiconductor device according to 13, further comprising a power detector detecting the power consumption of the neural network engine,
wherein the sequence controller corrects, based on a detection result of the power detector, a correlation between the degree of mismatching of the logic level among the plurality of pieces of input data and the predicted power consumption.

15. The semiconductor device according to claim 8, wherein the processor: predicts, based on the measurement result by the measurement circuit, the power consumption generated when the sequence controller operates the second DMA controller and the n multiply-accumulate units based on the input command before a change; reduces the number of parallel processings by the n multiply-accumulate units so that when the prediction power exceeds a preset target power, the prediction power approaches the target power within a range not exceeding the target power; and outputs the changed input command reflecting the number of reduced parallel processings to the sequence controller.

* * * * *